United States Patent [19]

Moser et al.

[11] Patent Number: 4,994,246

[45] Date of Patent: Feb. 19, 1991

[54] METHOD FOR REMOVING SULFUR OXIDES FROM COMBUSTING GASES IN WET, CALCIUM-BASED FLUE GAS DESULFURIZATION PROCESSES

[75] Inventors: Robert E. Moser, Palo Alto, Calif.; Frank Meserole, Austin, Tex.

[73] Assignee: Electric Power Research Institute, Inc., Palo Alto, Calif.

[21] Appl. No.: 280,752

[22] Filed: Dec. 6, 1988

[51] Int. Cl.$^5$ .......................... C01B 17/00; B01J 8/00
[52] U.S. Cl. .................................... 423/242; 423/243; 423/244
[58] Field of Search .......... 423/242 A, 242 R, 244 A, 423/244 R, 243

[56] References Cited

U.S. PATENT DOCUMENTS 3,644,087  2/1972  Urban ................................... 423/242
4,044,101  8/1977  Hisamatsu et al. ................... 423/243
4,061,743  12/1977 Senyo et al. .......................... 423/242

FOREIGN PATENT DOCUMENTS 3418285 12/1984  Fed. Rep. of Germany ...... 423/243

53-7577  1/1978  Japan .................................. 423/243

OTHER PUBLICATIONS

Moser, et al. "Control & Reduction of Gypsum Scale in Wet Lime/Limestone FGD Systems by Addition of Thiosulfate: Summary of Field Experiences", Abstract.
Rochelle, G. T. et al., "Thiosulfate Additives for Lime/Limestone Scrubbing", Abstract, 10th Symp. on Flue Gas Desulfurization, Atlanta, Ga., (11/86).
Rochelle, G. T. et al., "Thiosulfate as an Oxidation Inhibitor in Flue Gas Desulfurization Processes: A Review of R & D Results", Abstract, 9th Symp. on FGD (May 1985).

Primary Examiner—Gregory A. Heller
Attorney, Agent, or Firm—Flehr, Hohbach, Test, Albritton & Herbert

[57] ABSTRACT

A method is provided for improving the reliability, $SO_2$ removal and thiosulfate utilization in a wet lime/limestone flue gas desulfurization process by contacting the combustion gases in the presence of the wet lime or limestone with thiosulfate and an organic polyacid chelating agent.

8 Claims, No Drawings

METHOD FOR REMOVING SULFUR OXIDES FROM COMBUSTING GASES IN WET, CALCIUM-BASED FLUE GAS DESULFURIZATION PROCESSES

The present invention is directed to a method for improving the performance of wet, calcium-based flue gas desulfurization processes by use of thiosulfate and an organic polyacid chelating agent.

BACKGROUND OF THE INVENTION

There are sorbent materials, such as lime and limestone which are conventionally used in scrubbers to remove $SO_2$ from combustion gases. One of the problems however with lime or limestone scrubbing is the resultant chemical scaling in the scrubber process vessels, transfer lines and flue system due to the deposition of solid deposits such as gypsum. Thus, there is an additional cost involving costly clean-up problems, particularly for systems in which the scrubbing system is utilized in a calcium-based, wet flue gas desulfurization process. The severity of the scaling problem is related to the concentrations of calcium and sulfate in the scrubbing solution, the former being present as a result of dissolution of the lime or limestone and the latter of which results from the absorption of $SO_2$ and subsequent oxidation of dissolved sulfite. To reduce or eliminate the oxidation of sulfite to sulfate, thiosulfate has been utilized by reacting with free radicals to break the free radical chain reactions involved in the oxidation of sulfite to sulfate. These free radical chain reactions are also believed to be initiated by trace amounts of metal ion catalysts, such as iron or manganese, and by dissolved oxygen. The oxidation initiation of sulfite to sulfate, and to some extent the overall oxidation rates, are therefore functions of the liquid phase sulfite, dissolved oxygen, and catalyst concentrations. In addition, higher saturation temperatures which occur in flue gas desulfurization (FGD) systems in high moisture lignite fired boilers, also tend to increase oxidation.

In full scale flue gas desulfurization systems gypsum scaling is most likely to be a problem when the oxidation of sulfite to sulfate is above about 15% of the absorbed $SO_2$, and usually within the range of 15 to 40% of the absorbed $SO_2$. In this range calcium sulfate will precipitate both in the solid solution and as gypsum. Often there are not sufficient gypsum seed crystals to serve as precipitation sites in the slurry, so the gypsum also precipitates on vessels and pipe walls, forming scale deposits. However, when the oxidation is below 15%, particularly below about 10% of the absorbed $SO_2$, the gypsum relative saturation (defined as the product of the calcium and sulfate ion activities divided by the solubility product constant for calcium sulfate) is significantly below 1.0, and there are generally no gypsum scaling problems within the scrubber system.

One problem, however, is that there is not a consistent level of thiosulfate which can be predetermined for use in a slurry which will be effective to lower the oxidation rate below 15%. In some instances, the oxidation rate may be reduced below 5% with thiosulfate levels of a few hundred ppm, however, in other instances the oxidation rate is reduced to only about 15% even with thiosulfate levels of several thousand ppm. There exist conditions, therefore, where thiosulfate alone is only marginally effective in inhibiting sulfite oxidation.

It is thus an object of the present invention to provide an improved method for wet, calcium-based FGD scrubbing using wet lime/limestone and thiosulfate which results in improved reagent utilization while still maintaining, or even improving, the benefits of thiosulfate by reducing formation of gypsum scale, providing better solids handling properties and efficient $SO_2$ removal.

This and other objects of the invention will be apparent from the following description and from practice of the invention.

SUMMARY OF THE INVENTION

The present invention provides a method for reducing the accumulation of solid sulfate-containing deposits in apparatus for storing, transferring, and utilizing wet lime or limestone for desulfurization of combustion gases, comprising the step of contacting the combustion gases in a reaction in the presence of wet lime or limestone with the thiosulfate and an organic polyacid chelating agent, the thiosulfate and chelating agent being present in sufficient concentrations to diminish the amount of sulfate formed.

DESCRIPTION OF THE PREFERRED EMBODIMENTS

The preferred embodiments of the present invention will be described hereinbelow but it will be understood that various modifications may be made based on the following description, which modifications are intended to be within the scope of the present invention.

The present invention has been developed to improve the reliability and performance characteristics of a wet lime or limestone process for flue gas desulfurization of combustion gases. The present invention is not intended to be limited to the exact method or apparatus which is used in the FGD system and thus it is intended that the improvements and advantages obtained from the present invention be applicable to all methods and apparatus in which a wet lime or limestone slurry is utilized by placing the slurry in contact with combustion gases downstream from the combustion chamber.

A typical $SO_2$-scrubbing slurry or solution will contain a sorbent such as $CaCO_3$ or $Ca(OH)_2$ for the absorption of $SO_2$. According to the improvement according to the present invention, the slurry containing lime or limestone will also contain a thiosulfate salt, typically the calcium or sodium thiosulfate salt, but the ammonium or other salts may be utilized. The presence of the thiosulfate salt in the slurry solution prior to introduction to a reaction vessel is advantageous since it retards or eliminates oxidation of the sulfite to sulfate from contact, for instance, with dissolved oxygen in the slurry. The concentration of the thiosulfate in the slurry prior to introduction into an absorption vessel will preferably be in the range of about 50 to 2000 ppm in a slurry containing about 0.5 to 2.0% by weight of sorbent.

The solution or slurry containing the lime or limestone and thiosulfate will also contain an organic polyacid chelating agent such as ethylenediaminetetraacetic acid (EDTA), N-(2-hydroxyethyl) ethylene diamine-N,N',N'-triacetic acid (HEEDTA), citric acid, and the like. The quantity of organic polyacid chelating agent in the slurry will typically be in the range of 1 to 1000 mg/l of slurry, preferably at 10 mg/l of slurry. The preferred organic polyacid chelating agent is EDTA.

While not intending to be limited to a particular theory, it is believed that the organic polyacid chelating agent forms complexes with dissolved transition metals, such as iron and manganese, in the slurry, which in turn enhances the effectiveness of the thiosulfate in retarding oxidation. Furthermore it is believed that the initiation reactions which form free radicals involved in the free radical chain mechanism for oxidation of sulfite to sulfate are retarded or eliminated by forming complexes of transition metals with the organic polyacid chelating agent.

In one modification of the present invention the thiosulfate and/or organic polyacid chelating agent may be separately introduced into a reaction vessel from the lime/limestone slurry, so that all three components are mixed in situ. Alternatively, either the chelating agent or the thiosulfate may be mixed into the slurry before introduction into the vessel and the other agent, the chelating agent or thiosulfate, may be separately introduced.

In addition to providing for an oxidation rate of less than 15%, and particularly less than 10% of sulfite to sulfate based on absorbed $SO_2$, a benefit of adding both thiosulfate and the organic polyacid chelating agent to the lime/limestone solution or slurry is the improvement of the limestone utilization. That is, since it is believed that the presence of the chelating agent removes transition metal ions which would otherwise interfere with limestone dissolution and the efficacy of the thiosulfate, limestone utilization is improved. It is thus believed that limestone utilization results in a significant percentage reduction of the dissolved calcium resulting from the reduction of dissolved calcium sulfate which occurs as thiosulfate acts to reduce the formation rate of sulfate in the scrubbers. Moreover as the dissolved calcium level drops, there is a reduction in the calcium carbonate relative saturation, a factor which governs the magnitude of improvement in limestone utilization.

Moreover by producing a purer calcium sulfite crystal, i.e., little to no coprecipitation of calcium sulfate, larger crystals can be formed which will have improved settling and dewatering characteristics.

Having described the preferred embodiments the following examples are provided by way of illustration and is not intended to limit the invention in any way.

EXAMPLE 1

A utility operating a wet limestone FGD system, attempting to reduce gypsum scaling problems in their absorbers by using thiosulfate to inhibit sulfite oxidation and reduce gypsum relative saturation in the slurry, is unable to depress the gypsum relative saturation to below 1.0 no matter how much thiosulfate is added. However, by adding a combination of organic polyacid chelating agent and thiosulfate gypsum scaling is reduced, since the organic polyacid chelating agent effectively diminishes the concentration of trace metals which catalyze the oxidation initiation reaction. Thiosulfate thus more effectively reacts with the free radicals which are formed and quenches the oxidation propagation reactions to the point where the gypsum relative saturation is well below 1.0, thereby preventing gypsum scale formation.

EXAMPLE 2

A utility operating a wet limestone FGD system has been successful in inhibiting sulfite oxidation by using thiosulfate concentrations in excess of about 1000 ppm in its FGD system. By changing to a combination of 10 ppm EDTA and 100 ppm thiosulfate, the oxidation is equally well reduced but at lower costs to the utility.

We claim:

1. A method for reducing accumulation of solid sulfate-containing deposits in apparatus for storing, transporting or utilizing wet lime or limestone for combustion gas desulfurization, comprising the step of contacting said combustion gas in a reaction zone in the presence of said wet lime or limestone with thiosulfate and an organic polyacid chelating agent, said thiosulfate and chelating agent being present in sufficient concentrations to diminish the amount of sulfate formed as the result of oxidation of sulfite to sulfate.

2. A method according to claim 1 wherein said step of contacting said combustion gases in said reaction zone with said wet lime or limestone, thiosulfate and organic polyacid chelating agent is performed by introducing a mixture of said wet lime or limestone, thiosulfate and organic polyacid chelating agent into said reaction zone.

3. A method according to claim 1 wherein said step of contacting said combustion gas with said wet lime or limestone, thiosulfate and organic polyacid chelating agent is conducted by introducing said limestone or lime into the reaction zone and separately introducing said thiosulfate and said organic polyacid chelating agent into said reaction zone.

4. A method according to claim 1 wherein said thiosulfate comprises sodium or calcium thiosulfate.

5. A method according to claim 1 wherein said organic polyacid chelating agent is selected from the group consisting of ethylenediaminetetraacetic acid, N-(2-hydroxyethyl) ethylenediamine-N,N',N'-triacetic acid and a polycarboxylic acid.

6. A method according to claim 5 wherein said organic polyacid chelating agent comprises ethylene diaminetetraacetic acid.

7. A method according to claim 1 wherein said thiosulfate is present in said reaction zone in the concentration range of 50 to 2000 ppm.

8. A method according to claim 1 wherein said organic polyacid chelating agent is present in said reaction zone in a concentration in the range of 1 to 1000 mg/l of said slurry.

* * * * *